United States Patent [19]

Kleiner et al.

[11] 4,053,341

[45] Oct. 11, 1977

[54] LAMINATES OF POLYETHYLENE FOAM WITH AN ANISOTROPIC PORE STRUCTURE

[75] Inventors: Frank Gerald Kleiner, Cologne; Hans Radojewski, Leverkusen; Richard Mühlbauer, Leichlingen; Karl-Heinz Müller, Quadrath-Ischendorf, all of Germany

[73] Assignee: Bayer Aktiengesellschaft, Germany

[21] Appl. No.: 658,404

[22] Filed: Feb. 17, 1976

[30] Foreign Application Priority Data

Feb. 20, 1975  Germany .................... 2507274

[51] Int. Cl.² .................................. B32B 5/20
[52] U.S. Cl. .................................. 156/79; 156/244;
260/2.5 HA; 264/45.5; 264/45.9; 264/171;
264/DIG. 18; 428/218; 428/305; 428/315
[58] Field of Search ............. 428/305, 315, 425, 218;
264/171, 45.5, 46.5, 45.9, DIG. 18; 156/79, 244; 260/2.5 HA

[56] References Cited

U.S. PATENT DOCUMENTS

| | | | |
|---|---|---|---|
| 3,463,687 | 8/1969 | Folsom et al. | 264/46.5 |
| 3,608,006 | 9/1971 | Hosoda et al. | 156/79 |
| 3,936,565 | 2/1976 | Good | 264/45.5 |
| 3,954,537 | 5/1976 | Alfter et al. | 428/305 |
| 3,968,292 | 7/1976 | Pearman et al. | 428/305 |

*Primary Examiner*—Edward G. Whitby
*Attorney, Agent, or Firm*—Connolly and Hutz

[57] ABSTRACT

A process for the production of cross-linked polyethylene foam layers which have an anisotropic pore structure in at least one internal layer, wherein at least three polyethylene sheets which contain equal quantities of peroxide as cross-linking agent and differing quantities of a chemical blowing agent are arranged as a multilayer structure in such a way that the two external layers are formed by the sheets which contain a smaller proportion of blowing agent, and the structure is heated, preferably in a continuous heating furnace, so that the individual sheets are cross-linked and at the same time welded together to form a laminate which is subsequently foamed by increasing the temperature to between 190° and 250° C.

11 Claims, 1 Drawing Figure

U.S. Patent  Oct. 11, 1977  4,053,341
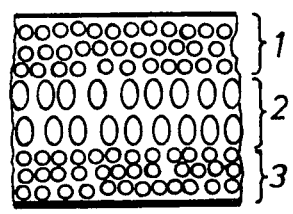

LAMINATES OF POLYETHYLENE FOAM WITH AN ANISOTROPIC PORE STRUCTURE

This invention relates to a process for the production of laminates from layers of cross-linked polyethylene foam, at least one of which has an anisotropic pore structure.

It is known that cross-linked polyethylene foams can be produced by a peroxidic cross-linking process in which a mixture of polyethylene, peroxide and a chemical blowing agent is continuously extruded to form a sheet which is then cross-linked in an oven and subsequently foamed when it has reached the necessary temperature for activating the blowing agent as described in German Offenlegungsschrift No. 1,694,130 and U.S. Pat. Spec. No. 3,098,831. Foams with a closed cell and pore structure are obtained by this process. Their density is uniform across the thickness of a foam layer. The density of these foams is controlled by the amount of blowing agent which they contain. It is also known that foams of differing densities can be heat welded together to produce foam laminates which have a sandwich-like structure in which the different layers have different densities. These laminates have no anisotropy in their pore structure and, owing to the fact that the individual layers are subsequently welded together, there is a thin compact layer between the porous layers. These compact layers have the disadvantage of increasing the density of the laminate and hence reducing the thermal insulation. Moreover, a certain amount of material is lost due to melting of the surface.

It has surprisingly been found that these disadvantages can be overcome and, in addition, foam laminates with improved mechanical properties can be obtained by the process according to the invention. This is a process for the production of cross-linked polyethylene foam layers which have an anisotropic pore structure in at least one internal layer, wherein at least three polyethylene sheets which contain equal quantities of peroxide as cross-linking agent and differing quantities of a chemical blowing agent are arranged as a multilayer structure in such a way that the two external layers are formed by the sheets which contain a smaller proportion of blowing agent, and the structure is heated, preferably in a continuous heating furnace, so that the individual sheets ae cross-linked and at the same time welded together to form a laminate which is subsequently foamed by increasing the temperature to between 190° and 250° C.

It is unexpectedly found that in the laminate obtained by the process according to the invention the lighter, internal layers contain cells which are elongated in a direction perpendicular to the layer, i.e. these layers have an anisotropic pore structure. The laminates are more rigid and have a higher compression strength than laminates obtained by the heat lamination of individual polyethylene foam layers.

The structure of the laminates produced according to the invention is represented schematically in the FIGURE as composed of three polyethylene foams.

Anisotropic cells elongated perpendicularly to the flat dimensions of the laminate can be seen in the middle layer. The greater the differences in density between the external layers and the middle layer, the more pronounced is this anisotropy. By reducing the quantity of blowing agent in the external layer to zero, it is possible to produce foams which have compact external layers and an anisotropic foam core.

The process according to the invention is preferably carried out using a multiple sheet extruder to extrude discontinuously or continuously polyethylene sheets or layers which all have the same peroxide content for cross-linking but contain differing proportions of blowing agent. The blowing agent contents of the external layers, which are preferably equal to each other, are always lower than those of the internal layers.

The process of mixing the polyethylene with cross-linking and blowing agents or concentrates of these agents in polyethylene is carried out in the extruder in which the mixture is subsequently shaped at temperatures below the decomposition point of the peroxide. The average time of stay in the extruder is about 5 minutes, so that cross-linking of the mixtures which are to be foamed is substantially suppressed at this stage.

The same result can also be obtained by extruding the individual layers separately, placing them above one another and heating them in a hot air oven. While the layers are being heated, they become welded together to form a compact, multilayered laminate which undergoes cross-linking at the same time and then foams up when the decomposition temperature of the chemical blowing agent is reached.

Cross-linking mainly takes place at tempertures starting from 160° C and the foaming processes take place at temperatures of from 190° to 250° C.

Polyethylene suitable for the production of laminates in accordance with the invention include low pressure ($d \sim 0.94$–$0.97$ g/cm$^3$) and high pressure polyethylenes ($d \sim 0.91$ to about 0.94 g/cm$^3$), high pressure polyethylene being preferred.

The peroxides used for cross-linking are suitably organic peroxides such as dicumylperoxide; 2,5-dimethyl-2,5-di-(tert.-butylperoxy)-hexane; 2,5-dimethyl-2,5-di-(tert.-butylperoxy)-hexine; tert.-butylhydroperoxide; cumyl-tert.-butylperoxide; di-tert.-butylperoxide and bis-(tert.-butylperoxi-isopropyl)-benzene. Dicumyl peroxide is preferred.

The peroxides are used in quantities of from 0.3 to 1.5% by weight, based on the total mixture, a degree of cross-linking of 25 to 80% preferably being achieved.

The chemical blowing agents are preferably those which decompose at temperatures above 190° C. Azodicarbonamide, disulphohydrazide and N,N'-dinitrosopentamethylenetetramine are advantageously used in quantities of from 2.5 to 15% by weight, based on the total quantity of mixture.

The process according to the invention may be carried out continuously or discontinuously.

The polyethylene foam laminates according to the invention may be used in the motor car industry, in particular for the manufacture of roof covers or wall linings in caravans.

EXAMPLE 1

Three layers lying one above the other were continuously extruded from an extruder to which a multiple sheet die was connected. The two external sheets consisted of 94.2% by weight of polyethylene, 5% by weight of azodicarbonamide and 0.8% by weight of dicumyl peroxide and the middle sheet consisted of 84.2% by weight of polyethylene, 15% by weight of azodicarbonamide and 0.8% by weight of dicumyl peroxide. This compact multilayer structure was introduced into a hot air oven where it was initially heated to 160° C and finally to 205° C. A laminate of polyethylene foam which had a density of 90 kg/m³ and isotropic pore structure in the two outer layers and a density of 30 kg/m³ and anisotropic pore structure in the middle layer was thereby obtained.

We claim:

1. A process for producing a laminate comprising a plurality of crosslinked polyethylene foam layers having an anisotropic pore structure in at least one internal layer, said process comprising the steps of arranging at least three polyethylene sheets or layers which contain equal quantities of a peroxidic crosslinking agent and differing quantities of a chemical blowing agent which decomposes at a temperature higher than the temperature at which the peroxidic crosslinking agent functions, as a multi-layer structure with each of the two external layers containing a smaller proportion of blowing agent than contained in the internal layer, heating the multi-layer structure to a temperature at which each of the sheets or layers is crosslinked and at the same time welded together to form a laminate and subsequently heating the laminate at a higher temperature which causes the chemical blowing agent to decompose and foam the laminate structure.

2. A process as claimed in claim 1, wherein the multi-layer structure is heated in a continuous heating furnace.

3. A process as claimed in claim 1, wherein the crosslinking takes place at a temperature of at least 160° C.

4. A process as claimed in claim 1, wherein the structure is heated to a temperature of from 190 to 250° C at the foaming stage.

5. A process as claimed in claim 2, wherein the polyethylene sheets or layers are extruded from a multiple sheet extruder.

6. A process as claimed in claim 1, wherein the two most external layers have equal blowing agent contents.

7. A process as claimed in claim 1, wherein the polyethylene sheets consist of high pressure polyethylene.

8. A process as claimed in claim 1, wherein the peroxide is used in a quantity of from 0.3 to 1.5% by weight, based on the total mixture.

9. A process as claimed in claim 1, wherein the polyethylene sheets are cross-linked to an extent of 25 to 80%.

10. A process as claimed in claim 1, wherein the blowing agent is used in a concentration of from 7.5 to 15% by weight, based on the total quantity of mixture.

11. A process as claimed in claim 1, wherein the blowing agent is used in a concentration of from 7.5 to 15% by weight, based on the total quantity of mixture.

* * * * *